April 24, 1962  W. A. JENSEN  3,030,998
SELF-CLEANING TIRE TREAD
Filed Feb. 19, 1960
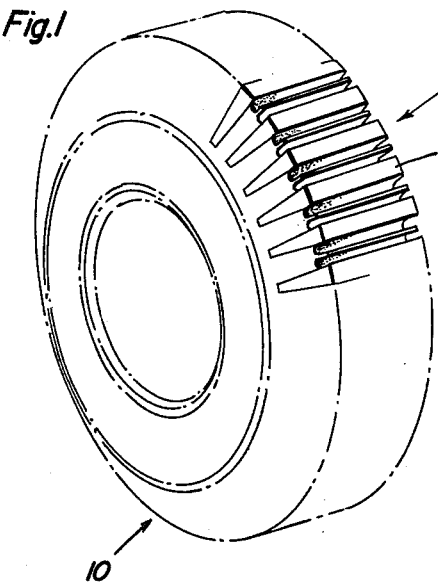
Fig.1
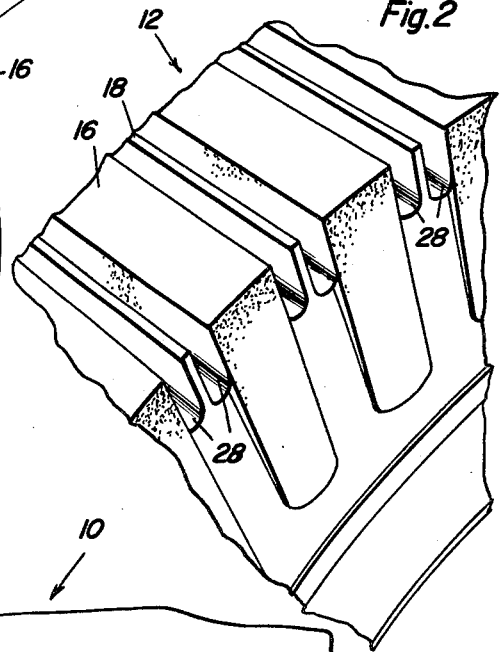
Fig.2
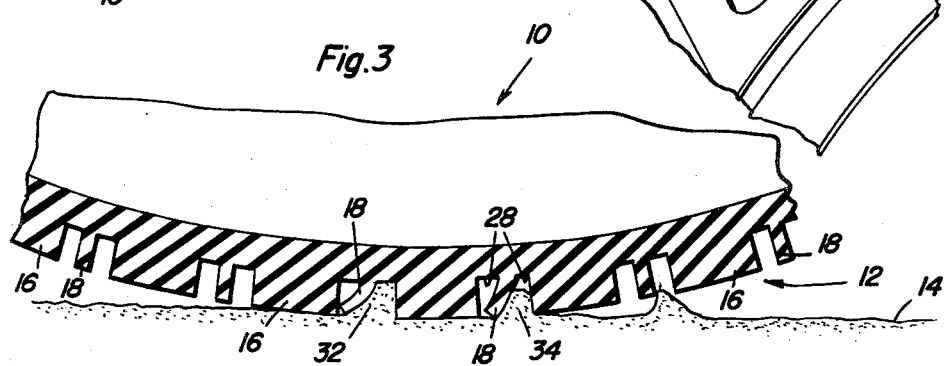
Fig.3
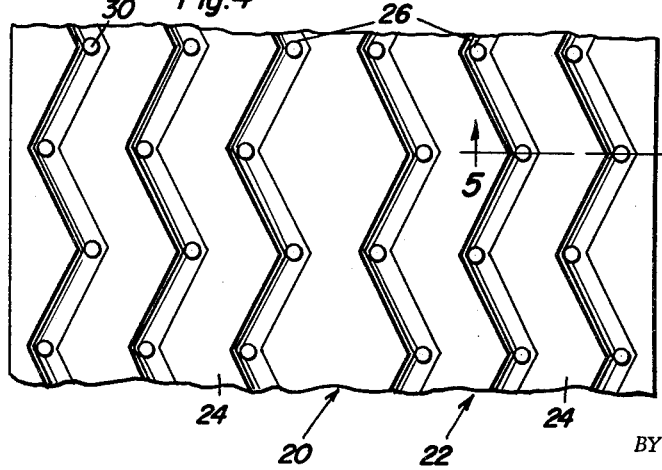
Fig.4
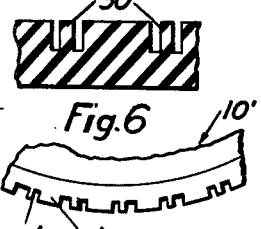
Fig.5
Fig.6
Waldo A. Jensen
INVENTOR.
BY *Clarence A. O'Brien*
*and Harvey B. Jackson*
Attorneys United States Patent Office 3,030,998
Patented Apr. 24, 1962

3,030,998
SELF-CLEANING TIRE TREAD
Waldo A. Jensen, 1807 E. 10th St., Sioux Falls, S. Dak.
Filed Feb. 19, 1960, Ser. No. 9,929
11 Claims. (Cl. 152—209)

This invention relates to rubber tires for vehicles and the like and more particularly to an improved traction tread design and structure for vehicle tires which will be self-cleaning during the operation of the vehicle on which the tires are mounted.

Various traction tread designs and structures have heretofore been developed for affording maximum traction on soft ground or snow and the like. Although, many of these tire designs and structures of traction terads have proven to be greatly effective in increasing the traction of a driving wheel, many of the more effective tread designs have proven to be quite noisy on smooth hard road surfaces. Furthermore, many of the more effective treads designed for maximum traction have a tendency to clog during repeated use on soft surfaces.

The more effective traction tread designs in the past have consisted of relatively large radially extending lugs disposed about the periphery of a tire tread with the lugs being spaced at substantial distances from adjacent lugs. The relatively large lugs and the relatively great spacing between adjacent lugs contribute to the production of considerable noise when traveling over smooth hard surfaces. In addition, the relatively great spacing between adjacent lugs provides a recess in which particles from relatively soft surfaces over which the tire is traveling may become embedded. The embedding or lodging of these particles between adjacent lugs is in most cases a gradual process, but extended service over relatively soft surfaces will eventually result in these recesses being at least partially if not substantially filled with accumulated particles from the soft surface. When these recesses have become filled, the effectiveness of the traction tread on the tire is greatly reduced.

It is therefore the main object of this invention to provide a self cleaning tire tread design or construction which will afford maximum traction and yet not become clogged with accumulated particles from relatively soft road surfaces or create excessive noise while traveling over smooth hard road surface.

A further object of this invention, in accordance with the immediately preceding object, is to provide a self-cleaning vehicle tire tread having a plurality of spaced, radially extending and generally parallel lugs disposed about the periphery of the tread of the tire with a plurality of radially extending cleaning element disposed between adjacent lugs with the cleaning elements having a longitudinal dimension relative to the tire tread considerably less than the radial extent of the cleaning element. These dimensions enable soft supporting surfaces to flex the cleaning elements and deflect them laterally throughout their radial extent relative to the tire wherein the particles of the soft supporting surface which become embedded between adjacent lugs of the tire tread will be expelled from between the lugs due to the inherent resiliency of the cleaning elements as the cleaning elements are rotated with the tire from contact with the supporting surface. Of course, the centrifugal force effected by rotation of the tire will also tend to return the cleaning elements to their normal radially extending position thereby ejecting any accumulated particles which have become lodged between adjacent lugs of the tire tread.

Yet another object of this invention, in accordance with the preceding objects, is to provide lugs on the tire tread which extend transversely of the tread of the tire and which also extend longitudinally of the tread of the tire a distance at least equal to the distance the lugs extend radially from the tread whereby the lugs will not be flexed laterally to interfere with the lateral flexing of the cleaning elements.

A still further object of this invention is to provide a tire tread having lugs which extend transversely of and the entire width of the tire tread with the cleaning elements being in the form of transversely extending ribs which are spaced equidistant from adjacent lugs and extend substantially the entire width of the tire tread.

A still further object of this invention is to provide longitudinal spacing of the transversely extending lugs which, when combined with the spacing of the transversely extending ribs between the lugs and the vertical extent of the ribs, enable the free ends or outer edges of the ribs to contact the adjacent surface of the adjacent lug when flexed and laterally deflected by a soft supporting surface whereby a minimum amount of particles from the supporting surface for the vehicle tire will be allowed to collect in the area enclosed by the laterally deflected rib and the lug against which the free end of the rib contacts upon the lateral flexing of the rib so that lateral flexing of the rib in that direction will not be impaired by a gradual build-up of particles of a soft road surface.

A final object to be specifically enumerated herein is to provide a self-cleaning tire tread of the traction type which will conform to conventional forms of manufacture and whose principles may also be constructed in the more conventional type of tire treads having longitudinally extending and transversely spaced ribs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the tire tread formed on a conventional type of vehicle tire, parts of the vehicle tire being shown in phantom lines;

FIGURE 2 is an enlarged fragmentary perspective view of the tire tread illustrated in FIGURE 1;

FIGURE 3 is a fragmentary vertical longitudinal sectional view of the tire terad on somewhat of an enlarged scale;

FIGURE 4 is a view in plan of a modified form of the vehicle tire tread;

FIGURE 5 is a transverse vertical sectional view taken substantially upon the plane indicated by the section line 5—5 of FIGURE 4; and FIGURE 6 is a fragmentary vertical longitudinal sectional view similar to FIGURE 3 but on a reduced scale and showing a further modified form of tire tread.

Referring now more specifically to FIGURES 1 to 3, of the drawings, there will be seen a vehicle tire generally designated by the reference numeral 10 which includes a tread construction generally designated by the reference numeral 12 formed on the ground engaging surfaces of the tire 10.

The tread construction 12 includes a plurality of generally transversely and radially extending lugs 16 disposed about the periphery of the tire 10. Disposed intermediate adjacent pairs of lugs 16 is a transversely and radially extending rib 18. The lugs 16 extend longitudinally of the tread construction 12 a distance equal to at least their radial extent.

Although the lugs 16 are illustrated as extending substantially parallel to the axis of rotation of the wheel 10, it is to be noted that they could be slightly inclined with respect to the axis of rotation of the wheel 10 if it is desired.

It is also to be noted that the ribs 18 are spaced equidistant from the adjacent lugs 16 and that they extend substantially parallel to the lugs 16. Furthermore, the ribs 18 extend radially from the tire 10 a distance greater than that which the ribs extend about the periphery of the tread construction 12.

The general positioning of the elements comprising the tread construction 12 and the general dimensions of these elements as hereinbefore set forth and illustrated in FIGURES 1 through 3 of the drawings are not to be considered the only manner in which the lugs 16 and ribs 18 may be arranged and the only dimensions of these elements which will operate effectively as will be pointed out hereinafter.

Attention is now directed to FIGURES 4 and 5 of the drawings wherein there will be seen a modified form of the tire tread construction which is generally designated by the reference numeral 20. The tire on which the tread construction 20 is formed is generally designated by the reference numeral 22 and it will be noted that the tread construction 20 includes a plurality of longitudinally extending and generally parallel lugs 24 which extend radially from the tire 22. The spacing between the lugs 24 may be referred to as longitudinally extending grooves 26 as the spacing between the lugs 16 and the ribs 18 of the tread construction 12 may be referred to as grooves 28.

The tread construction 20 has a plurality of cleaning elements 30 which are spaced longitudinally along each of the grooves 26 and extend radially from the tire 22. Inasmuch as the cleaning elements 30 are provided and designed for the same purpose as the ribs 18, the ribs 18 may also be deemed cleaning elements.

It will be noted, with particular attention directed to FIGURE 5 of the drawings, that the cleaning elements 30 are substantially circular in cross-section and that they extend transversely of the tread construction 20 a distance equal to at least half the width of the grooves 26.

With attention now directed to FIGURE 3 of the drawings the operation of the tread construction 12 will be observed in various progressive stages. The rotation of the tire 10 is in a counterclockwise direction and the various elements of the tread construction 12 contacting the supporting surface 14 are illustrated as if power is being supplied to rotate the tire 10 in a counterclockwise direction. Inasmuch as the lugs 16 extend a substantial distance across the tread construction 12 and they also extend longitudinally of the tread construction a distance greater than their radial extent, the lugs 16 support the weight being carried by the tire 10 without being laterally deflected in either direction other than a minimum amount which is negligible as they compress radially only slightly in proportion to the weight being supported by the tire. As the lugs 16 engage the supporting surface 14 any tendency of the tire 10 to slide over the surface 14 will result in the ribs 18 contacting the supporting surface being laterally deflected forwardly relative to the direction of rotation of the tire 10 as at 32. The rib 18 is deflected laterally until its free edge contacts the lug 16 disposed forwardly of that rib 18 and will remain in this laterally deflected position until the rib 18 is rotated out of contact with the supporting surface 14 upon further rotation of the tire 10. As the rib 18 begins to move out of contact with the supporting surface 14, the natural resiliency of the rib 18 combined with the centrifugal force generated by the rotating tire 10 will tend to return the rib 18 to its normal radially extending position whereupon that portion of the supporting surface 14 which was lodged between adjacent lugs 16 as at 34 is ejected from between the lugs 16 upon the return of the rib 18 to its radially extending position. Thus, portions of the supporting surface which become lodged between adjacent lugs 16 are expelled from between the lugs 16 as soon as that area is rotated from contact with the supporting surface 14. That portion of the tire tread construction 12 is then free from any accumulation of loose particles of the supporting surface 14 whereupon its effectiveness will not be impaired upon subsequent engagement with the supporting surface 14.

The cleaning elements 30 operate in the same manner as the cleaning elements 18 when they are rotated in contact with the supporting surface 14 although it is to be noted that the lateral deflection of the cleaning elements 30 in a direction opposite to the rotation of the tire 22 will not clean the entire length of the grooves 26 inasmuch as adjacent cleaning elements in each groove 26 are not aligned longitudinally of the tread construction 20.

With reference again to the tread construction 12 it is to be understood that the longitudinal spacing of the lugs 16 is such that a minimum amount of noise would be effected by these lugs upon a smooth hard road surface and also that the positioning of the ribs 18 between the lugs 16 also enables the ribs 18 to reduce the longitudinal spacing between adjacent road contacting surfaces of the tread construction 12 which will further tend to reduce the noise of the tread construction 12 traveling over a smooth hard road surface.

It is to be noted from FIGURE 6 that the ribs 18' of the tire 10' similar to ribs 18 could be spaced closer to one of the adjacent lugs 16' than to the other adjacent lug which would enable the ribs 18' to be flexed laterally a greater amount and to have a smaller area from which to eject accumulated particles of a road surface. This would, of course, be true only if the ribs 18' were positioned closely adjacent the lug 16' of the adjacent lugs 16' which is last to contact a supporting surface. If it is desired, each of the lugs 18' may be so positioned, or, approximately half of the lugs could be positioned in this manner with the other half being positioned adjacent the lug first contacting a supporting surface so that the last-mentioned positioning of the lugs 18' would in effect result in the former positioning of the lugs 18' when the tire 10' is reversed in rotation. Therefore, the tire 10' could be afforded maximum traction while rotating in either direction.

It is also to be noted that the ribs 18 extend radially from the tire 10 a distance greater than the distance between the rib 18 and the adjacent lugs 16 wherein the free edge of the rib 18 will be laterally deflected until it contacts the adjacent lug 16 so as to enclose the groove 28 disposed forwardly of the rib 18 to exclude particles of the supporting surface 14 from entrance into that groove 28 which would possibly cause an accumulation of these particles and subsequently hinder the lateral deflection of the rib 18 whereupon its effectiveness to eject accumulated particles of the supporting surface 14 would be reduced.

With attention now directed to FIGURES 1 and 4 of the drawings, it will be noted that the tread construction 12 could be quite easily formed on that conventional type of tread construction 20 illustrated in FIGURE 4 of the drawings. If it were to form the tread construction 12 in a tire 10 having a conventional type of tread construction including longitudinally extending, transversely spaced and radially extending lugs, the tread construction 20 can be formed by forming a series of spaced pairs of transversely extending grooves across the conventional tire tread with the dimensions and positioning of the grooves such as grooves 28 being substantially similar to that which would effect the forming of either of the various variations of the tread construction 12 referred to herein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle tire self-cleaning tread comprising a plurality of generally transversely extending and radially extending lugs disposed in spaced relation about the periphery of said tread, a plurality of generally transversely extending and radially extending ribs disposed about the periphery of said tread and singly between pairs of adjacent lugs, said lugs each extending about the periphery of said tread a distance at least equal to the distance said lugs extend radially from said tread, said ribs each extending radially from said tread a distance greater than the distance said ribs extend about the periphery of said tread, and said ribs each extending about the periphery of said tread a distance considerably less than the distance between each of said ribs and at least one of the adjacent lugs.

2. The combination of claim 1 wherein said lugs and said ribs extend substantially transversely of said tread.

3. The combination of claim 2 wherein said ribs are spaced equidistant from adjacent lugs.

4. The combination of claim 1 wherein said lugs and said ribs extend substantially transversely of said tread and some of said ribs are spaced closer to one of the adjacent lugs than the other.

5. The combination of claim 1 wherein said lugs and said ribs each extend substantially transversely of said tread and at least some of said ribs are spaced closer to one of the adjacent lugs than the other, each of said other lugs being positioned first in the direction of rotation of said tire.

6. The combination of claim 1 wherein said lugs and said ribs extend substantially transversely of said tread and at least some of said ribs are spaced closer to one of the adjacent lugs than the other, certain of said other lugs being positioned first in the direction of rotation of said tire relative to the closer ribs and other of said lugs being positioned last in the direction of rotation of said tire relative to the closer ribs.

7. A vehicle tire self-cleaning tread comprising a plurality of spaced, radially extending, generally parallel and elongated lugs disposed about the periphery of said tread, a plurality of radially extending cleaning elements singly disposed between adjacent lugs, the width of each of said lugs exceeding its radial extent and the radial extent of each of said elements exceeding its extent about the periphery of the tread.

8. A vehicle tire self-cleaning tread comprising a plurality of generally transversely extending and radially extending lugs disposed in spaced relation about the periphery of said tread, a plurality of generally transversely extending and radially extending ribs disposed about the periphery of said tread and disposed singly between pairs of adjacent lugs, said lugs each extending about the periphery of said tread a distance at least equal to the distance said lugs extend radially from said tread, said ribs each extending radially from said tread a distance greater than the distance said ribs extend about the periphery of said tread and a distance greater than the distance between the rib and the adjacent lugs 9. The combination of claim 1 wherein said lugs and said ribs extend substantially transversely of said tread and said ribs are spaced closer to one of the adjacent lugs than the other, each of said other lugs being positioned first in the direction of rotation of said tire, said ribs each extending radially of said tread a distance greater than the distance between the rib and the adjacent other lug.

10. The combination of claim 1 wherein the outermost extremities of said lugs and said ribs lie along a circle generated by the rotation of a point about the center of said tire in a plane in which said tire is disposed.

11. The combination of claim 1 wherein said lugs and ribs each extends across the entire width of said tread.

References Cited in the file of this patent

UNITED STATES PATENTS

| | | |
|---|---|---|
| 1,211,958 | Overman | Jan. 9, 1917 |
| 1,411,671 | Schrank | Apr. 4, 1922 |
| 2,104,532 | Sommer | Jan. 4, 1938 |
| 2,240,542 | Bourdon | May 6, 1941 |

FOREIGN PATENTS

| | | |
|---|---|---|
| 1,202,712 | France | July 20, 1959 |